United States Patent
Bredol et al.

[11] Patent Number: 6,093,492
[45] Date of Patent: Jul. 25, 2000

[54] PHOSPHOR COMPOSITION WITH A HYDROXYCARBOXYLIC-ACID COATING

[75] Inventors: Michael Bredol; Jacqueline Merikhi, both of Aachen, Germany

[73] Assignee: U.S. Philips Corporation, New York, N.Y.

[21] Appl. No.: 08/982,971

[22] Filed: Dec. 2, 1997

[30] Foreign Application Priority Data

Dec. 6, 1996 [DE] Germany ............... 196 50 602

[51] Int. Cl.⁷ .................. B32B 5/16; C09K 11/08
[52] U.S. Cl. .................. 428/403; 252/301.4 S
[58] Field of Search ............... 428/357, 402, 428/403; 252/301.4 S

[56] References Cited

U.S. PATENT DOCUMENTS 5,200,250 4/1993 Tono et al. ............... 428/144

FOREIGN PATENT DOCUMENTS

000423790A2 4/1991 European Pat. Off. .
403134089A 6/1997 Japan .

*Primary Examiner*—Paul Thibodeau
*Assistant Examiner*—Sheeba Ahmed
*Attorney, Agent, or Firm*—Norman N. Spain

[57] ABSTRACT

A phosphor composition of a sulphide-containing phosphor with a coating comprising a hydroxycarboxylic acid can be stored as a dry substance in the desagglomerated state and can be readily resuspended.

10 Claims, No Drawings

PHOSPHOR COMPOSITION WITH A HYDROXYCARBOXYLIC-ACID COATING

BACKGROUND OF THE INVENTION

The invention relates to a phosphor composition of a sulphide-containing phosphor and a coating, in particular a phosphor composition of an oxysulphide phosphor.

Oxysulphides of yttrium, lanthanum, gadolinium and the like are used as the starting material for luminescent materials, such as in particular phosphors for cathode ray tubes. Particularly europium-activated yttrium oxysulphide is used on a large scale for the manufacture of color display screens. In the customary methods of manufacturing color display screens, the phosphor is processed either as a light-sensitive, aqueous powder suspension (flow-coating process) or as a flowable powder or a solid powder which can be applied by dusting (dusting process). In these processes, it is very important that the phosphor powder contains only individual desagglomerated phosphor particles and is free of agglomerates because agglomerates adversely affect the quality of the display screen. Therefore, only if a phosphor can be completely desagglomerated is it fit to be processed. In customary desagglomeration processes, the raw, still agglomerated phosphor is subjected to a wet-grinding operation in an ammoniacal solution. This results in an ammoniacal suspension of the phosphor which, when it is stirred constantly, can resist reagglomeration for many hours. In this desagglomerated state, customarily also the surface of the phosphor powder is subjected to refining treatments, such as latex coating, pigmentation etc. If an acid phosphor suspension is necessary for the further manufacture of the display screen, then this can be prepared by carefully acidifying the ammoniacal phosphor suspension, while stirring continually. However, the acid phosphor suspension is much more unstable relative to reagglomeration than the ammoniacal suspension and keeps only for a very short time.

However, the phosphor powder desagglomerated by wet-grinding in an ammoniacal medium cannot be isolated and stored. Once the powder suspension has sedimented, desagglomeration requires a new wet-grinding operation. As a result, the preparation of storable, desagglomerated phosphor powder, which can be resuspended without having to be subjected to another wet-grinding operation, requires a suitable surface conditioning. In known methods, this is achieved by coating the phosphor particles with fine inorganic particles, such as silicon dioxide, aluminum oxide, titanium dioxide, iron oxide and the like, and/or organic polymers, such as acrylates, which preclude reagglomeration. However, these inorganic substances lead to a reduction of the luminescent efficiency of the phosphor. In the manufacturing process for the display screen, the organic coating substances are often incompletely pyrolyzed, thus causing greying of the finished phosphor layer and a reduction of the light efficiency of the phosphor screen.

SUMMARY OF THE INVENTION

As a result, it is an object of the present invention to provide a phosphor preparation which, in the desagglomerated state, can be stored as a dry substance state and which exhibits a high luminescent efficiency.

In accordance with the invention, this object is achieved by a phosphor preparation of a sulphide-containing phosphor with a coating comprising a hydroxycarboxylic acid. The coating comprising a hydroxycarboxylic acid bonds well, is not lost during separation of the phosphor and does not exhibit a reduction in effectiveness. This enables the phosphor to be resuspended without the necessity of another wet-grinding operation. The coating can be applied in a very small thickness without a reduction in effectiveness, so that unnecessary light losses are precluded. During the manufacture of this coating for the display screen, it is pyrolyzed completely so that this coating does not cause greying of the phosphor coating on the display screen. This coating does not give off substances which are detrimental to the environment and can be renewed by simple means during recycling the phosphor.

DE-A-3931691 discloses a method of increasing the light efficiency of terbium-activated SE-phosphors on the basis of oxysulphide by subjecting the phosphor grains to an aqueous etching treatment using an acid mixture of organic and inorganic acids. Citric acids are used as the organic acid.

Within the scope of the invention, it is preferred that the hydroxycarboxylic acid is an α-hydroxycarboxylic acids. Both in acid and alkaline solutions, these acids are resistant to dehydration and can very readily be pyrolyzed.

It is further preferred that the hydroxycarboxylic acid is selected from the group comprising tartaric acid and citric acid. These α-hydroxycarboxylic acids exhibit a very good surface affinity for the phosphor powder.

Within the scope of the invention it is particularly preferred that the phosphor is an oxysulphide phosphor.

DETAILED DESCRIPTION OF THE INVENTION

These and other aspects of the invention will be apparent from and elucidated with reference to the embodiments described hereinafter.

As the starting material for the phosphor preparation in accordance with the invention use can be made of a sulphide-containing phosphor such as ZnS:Cu,Al, ZnS:Cu, Au,Al, ZnS:Ag,Al or ZnS:Ag,Cl. Use is preferably made of oxysulphide phosphors, in particular oxysulphides of yttrium, lanthanum and gadolinium. The phosphor coating comprises a hydroxycarboxylic acid, for example glycolic acid $HOCH_2COOH$, lactic acid $CH_3CHOHCOOH$, hydroxybutyric acid $CH_3CH_2CHOHCOOH$, mandelic acid $C_6H_5CHOHCOOH$, glyceric acid $HOCH_2CHOHCOOH$, malic aicd $HOOCCH_2CHOHCOOH$, tartaric acid $HOOCCHOHCHOHCOOH$, citric acid $HOOCCH_2C(OH)(COOH)CH_2COOH$, etc. Citric acid and tartaric acid are particularly suitable. The phosphor coating may further comprise organic and inorganic pigments which serve as color filters or to bring about desagglomeration.

The coating forms a protective layer of one or a few molecular layers, which accelerates desagglomeration during the manufacture of the phosphor preparation and precludes reagglomeration. Depending on the type of preparation, the hydroxycarboxylic acid is a free acid or an anion bonded to the powder surface.

To manufacture the phosphor preparation in accordance with the invention use is made of the washed and flux-free phosphor powder. However, it is alternatively possible to use a phosphor powder which has already been coated with pigment particles. The phosphor powder is suspended in water. The coating reaction can be carried out in a weakly acid or alkaline medium. However, the pH-value should not decrease to a value below pH=4; if necessary, the basicity of the aqueous suspension must be raised by means of a base.

Subsequently, a quantity of hydroxycarboxylic acid ranging from 0.001 to 10% by weight, preferably from 0.1 to 3% by weight with respect to the phosphor is added to the aqueous suspension. In an alkaline suspension, a small concentration may be sufficient, whereas in an acid suspension at least 0.1% by weight is necessary. The phosphor is ground in this suspension until it has desagglomerated completely. This can be checked by measuring the particle size during the wet-grinding operation. If necessary, the coated phosphor is subsequently separated from the grinding bodies by sieving and filtered. Finally, the phosphor is dried.

The coating of hydroxycarboxylic acid bonds well to the phosphor surface and is not lost when the phosphor is separated from the aqueous suspension. The coating enables the desagglomerated phosphor to be stored in a dry state and to be resuspended without the necessity of another wet-grinding operation. Should the coating become detached or undergo abrasion after the phosphor has been suspended for a relatively long period of time, then said coating can be readily renewed. The thin protective layer of hydroxycarboxylic acid is completely pyrolyzed during firing of the completed display screen or display tube.

EXAMPLE 1

A quantity of 100 g of washed $Y_2O_2S$:Eu-powder are mixed with approximately the same quantities of grinding bodies and water. A quantity of 1 g of tartaric acid is dissolved in the water. By means of an ammonia solution, the pH-value of the suspension is set at pH=9. By means of water and grinding bodies, the viscosity of the suspension is regulated so that it can be ground completely and uniformly. The particle size of the phosphor is checked at regular intervals. When a particle size of 6.5 $\mu$m is reached, the grinding bodies are sieved off. The desagglomerated, coated phosphor powder is isolated by filtration or sedimentation. After a subsequent drying operation at 120° C., the phosphor powder is ready for use.

To resuspend the phosphor preparation thus manufactured, it is stirred into water and subjected to an ultrasound treatment for several minutes. The measured particle size of the resuspended phosphor preparation corresponds to that of the starting powder having a particle size of 6.5 $\mu$m. The suspension is ready for use again.

EXAMPLE 2

A quantity of 100 g of washed $Y_2O_2S$:Eu-powder are mixed with approximately the same quantities of grinding bodies and water. A quantity of 1 g of citric acid is dissolved in the water. By means of an ammonia solution, the pH-value of the suspension is set at pH=9. Water and grinding bodies are used to regulate the viscosity of the suspension so that it can be ground uniformly and completely. The particle size of the phosphor is checked at regular intervals. When a particle size of 6.5 $\mu$m is reached, the grinding bodies are sieved off. The desagglomerated, coated phosphor powder is isolated by filtration or sedimentation. After a subsequent drying operation at 120° C., the phosphor powder is ready for use. To resuspend the phosphor preparation thus prepared, it is stirred into water and subjected to an ultrasound treatment for several minutes. The measured particle size of the resuspended phosphor preparation corresponds to that of the starting powder having a size of 6.5 $\mu$m. The suspension is now ready for use again.

EXAMPLE 3

A quantity of 100 g of washed $Y_2O_2S$:Eu-powder are mixed with approximately the same quantities of grinding bodies and water. A quantity of 1 g of citric acid is dissolved in the water. By means of an ammonia solution, the pH-value of the suspension is set at pH=4. Water and grinding bodies are used to regulate the viscosity of the suspension so that it can be ground uniformly and completely. The particle size of the phosphor is checked at regular intervals. When a particle size of 6.5 $\mu$m is reached, the grinding bodies are sieved off. The desagglomerated, coated phosphor powder is isolated by filtration or sedimentation. After a subsequent drying operation at 120° C., the phosphor powder is ready for use.

To resuspend the phosphor preparation thus manufactured, it is stirred into water and subjected to an ultrasound treatment for several minutes. The measured particle size of the resuspended phosphor preparation corresponds to that of the starting powder having a particle size of 6.5 $\mu$m. The suspension is now ready for use again.

What is claimed is:

1. A phosphor composition of a sulphide-containing phosphor with a coating consisting of a hydroxycarboxylic acid.

2. A phosphor composition as claimed in claim 1, characterized in that the hydroxycarboxylic acid is an α-hydroxycarboxylic acid.

3. A phosphor composition as claimed in claim 1, characterized in that the hydroxycarboxylic acid is selected from the group consisting of tartaric acid and citric acid.

4. A phosphor composition as claimed in claim 1, characterized in that the phosphor is an oxysulphide-phosphor.

5. A sulfide-containing phosphor powder, wherein the powder comprises phosphor particles provided with a coating consisting of a hydroxycarboxylic acid.

6. The powder of claim 5 wherein the phosphor is an oxysulfide phosphor and the hydroyycarboxylic acid is selected from the group consisting of tartaric acid and citric acid.

7. A phosphor composition consisting of a $Y_2O_2S$ phosphor provided with a coating consisting of a hydroxycarboxylic acid.

8. A phosphor composition as claimed in claim 7, characterized in that the hydroxycarboxylic acid is an α-hydroxycarboxylic acid.

9. A phosphor composition as claimed in claim 7, wherein the hydroxycarboxylic acid is selected from the group consisting of tartaric acid and citric acid.

10. A phosphor composition of claim 7, wherein the coating contains at least one pigment.

* * * * *